United States Patent
Gelf

(10) Patent No.: US 7,505,997 B1
(45) Date of Patent: Mar. 17, 2009

(54) METHODS AND APPARATUS FOR IDENTIFYING CACHED OBJECTS WITH RANDOM NUMBERS

(75) Inventor: Alexander Gelf, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 429 days.

(21) Appl. No.: 10/838,618

(22) Filed: May 3, 2004

(51) Int. Cl.
*G06F 17/00* (2006.01)

(52) U.S. Cl. .................. 707/104.1; 707/101; 707/102; 707/103 R

(58) Field of Classification Search ............... 707/1–10, 707/100–104.1, 200–206
See application file for complete search history.

(56) References Cited

U.S. PATENT DOCUMENTS 5,467,472 A * 11/1995 Williams et al. ............... 707/1
6,502,097 B1 * 12/2002 Chan et al. .................. 707/100

OTHER PUBLICATIONS

U of A Cog Sci Dictionary, "Associative Memory," http://www.psych.ualberta.ca/~mike/Pearl_Street/Dictionary/contents/A/associative_mem..., downloaded from the Internet on Oct. 5, 2004.
David Chappell: "The Joy of Reference Counting," copyright 2004, http://www.chappellassoc.com/articles/article_Refer_Counting.html, downloaded from the Internet on Oct. 5, 2004.

* cited by examiner

*Primary Examiner*—Isaac M Woo
(74) *Attorney, Agent, or Firm*—Osha - Liang LLP

(57) ABSTRACT

Methods and apparatus for obtaining a value from an associative dictionary are disclosed. Generally, an associative dictionary maps one or more keys to one or more values, enabling retrieval of each of the values using the corresponding one of the keys. The associative dictionary may be implemented using a variety of data structures such as an array or other suitable data structure. A representation structure including a data portion storing a particular data element (e.g., object) is obtained, where the representation structure further includes a reference counter field storing a reference counter indicating a number of wrapper structures referencing the representation structure and an identifier field storing an identifier identifying the data element. The identifier is obtained from the identifier field of the representation structure and provided as a key to the associative dictionary. This enables a value corresponding to the identifier to be obtained from the associative dictionary, thereby enabling the data element to be used as a key to the associative dictionary. In addition, equivalence of two data elements may be ascertained via comparison of the corresponding identifiers.

10 Claims, 3 Drawing Sheets

METHODS AND APPARATUS FOR IDENTIFYING CACHED OBJECTS WITH RANDOM NUMBERS

BACKGROUND

Various mechanisms have been developed for managing objects in an object-oriented environment. One of the most efficient and popular techniques of managing objects with efficient memory usage is known as "reference counting."

FIG. 1 is a diagram illustrating an exemplary implementation of the reference counting technique. Consider an implementation of an object storing a string. One technique for implementing the reference counting technique would be to generate a data structure 102 including a wrapper structure 104 and a representation structure 106. The wrapper structure 104 references the representation structure 106 (e.g., via a pointer 105 to the memory location of the representation structure 106). For instance, the wrapper structure 104 may be an object. A single representation structure 106 may have multiple wrapper structures pointing to it (not shown to simplify illustration). The representation structure 106 contains the actual data bits (such as the string data in this example) and a reference counter 108 (e.g., variable) that enumerates all wrapper structures pointing to the same representation structure 106. The data 110 (e.g., string) is accessed by a data pointer 112 of the representation structure 106. In this example, the data 110 stored is the string "This is a string." The data 110 may be stored in a data structure such as an object. Both the wrapper structure 104 and representation structure 106 may therefore be implemented as objects.

The goal of reference counting is to reduce the costs both in time and memory for operations such as copying and sharing data structures. For example, if a programmer wishes to duplicate a string, instead of duplicating the entire memory occupied by the string's characters, the reference counter 108 of the representation structure 106 is incremented by one.

FIG. 2 is a diagram illustrating an exemplary implementation 200 of the reference counting technique after a copy operation has been performed. Consider an object A of type string that represents a string "This is a string." In this example, object A 202 is the wrapper structure that points to the representation structure 204 including a reference counter 206 equal to 1 and a pointer 208 to the string "This is a string."

Application of a copy operation (duplication) of the data (e.g., string) will generate a second wrapper structure 210, object B, which points to the representation structure 204 (typically to the memory location of the representation structure 204). In addition, the reference counter 206 is incremented to 2, indicating that two different wrapper structures (or objects) refer to the representation structure 204. Thus, using the reference counting technique, the same data is shared between two objects efficiently. Another advantage of the reference counting technique is that representation structures can be relocated in memory (e.g., to optimize memory consumption via memory recycling algorithms) while maintaining a reference to the representation structures.

Data or associated objects may be used as keys for use in accessing other data via a data structure such as a table or associative dictionary. Data structures such as associative dictionaries create a one-to-one relationship between a set of keys and a set of values such that one of the set of keys can be used to retrieve a corresponding one of the set of values.

One example of a specific implementation of an associative dictionary is an array, where a set of keys corresponds to a set of integer values. Another example of an associative dictionary is a dictionary that maps strings to numbers denoting the number of words in the string. For instance, the string "A string" may be used as a key to access the number 2. In such a dictionary, the string key "count these words" corresponds to an integer 3, which may be stored in an object.

Implementing associative dictionaries in an environment that uses reference-counted objects presents a significant problem. As described above, an associative dictionary creates a one-to-one relationship between keys and corresponding values. Sometimes, it is desirable to use an object as a key to access a corresponding value in an associative dictionary. For instance, an application might compute a function that takes a string object as an argument and performs calculations using this string object. To save execution time upon the next invocation of this function, it may be desirable to store the argument and the result of this function in the cache. Thus, there is a need to reliably identify such key objects.

As set forth above, wrapper structures are generally pointers to the memory location of the representation structure. By de-referencing these pointers, it is possible to ascertain whether two wrapper structures point to the same memory location and therefore point to the same object. However, sometimes it may be desirable to optimize programs' memory usage by relocating some objects to a memory area different from where these objects were originally stored. Since memory may be recycled or otherwise optimized, the address of the representation structure may not remain the same. As a result, the memory address of the representation structure is not the optimal identifier for use as a key in an associative dictionary.

In addition to using the memory address for the purpose of identifying a key in an associative dictionary, it is also possible to perform a computational calculation on the key object, which is commonly referred to as "hashing" or "calculating the hash value." However, problems associated with hashing include collisions and computational complexity. A collision occurs when two different objects have an identical hash value. Since associative dictionaries define a one-to-one mapping between key objects and corresponding values, collisions can cause critical errors in the implementation of associative dictionaries. Even if collisions could be avoided, the computational complexity of calculating hash functions typically slows programs down.

SUMMARY

Method and apparatus for efficiently identifying data (e.g., objects) are disclosed. This may be accomplished, for example, by assigning an identifier such as a random number to identify a data element upon generation (e.g., to identify an object upon object instantiation). In this manner, the identifier may be used to identify the data element (e.g., object).

In accordance with one aspect of the invention, methods and apparatus for obtaining a value from an associative dictionary are disclosed, where the associative dictionary maps one or more keys to one or more values enabling retrieval of each of the values using the corresponding one of the keys. When a data element is stored, an identifier identifying the data element is generated. For instance, the data element may be an object. Thus, the identifier may be generated when the object is instantiated. As one example, the identifier may be a random number generated using a random number generator. The identifier is then associated with the data element (e.g., object). The identifier associated with the data element may then be provided as a key to the associative dictionary. In this manner, a value corresponding to the identifier may be obtained from the associative dictionary, thereby enabling the identifier identifying the data element to be used as a key to the associative dictionary.

As set forth above, in accordance with one aspect of the invention, an identifier (e.g., random number) is associated with a data element (e.g., object). This association may be accomplished using a variety of methods and/or data structures. For instance, a representation structure used in reference counting methods may be used to associate the identifier with the data element, as will be described in further detail below.

In accordance with one aspect of the invention, methods and apparatus for storing a data element using a representation structure are disclosed. First, a representation structure is generated. In accordance with one embodiment, the representation structure includes a data portion for storing a data element, a reference counter field for storing a reference counter indicating a number of wrapper structures referencing the representation structure, and an identifier field for storing an identifier identifying the data element. A data element (e.g., object) is then stored in the data portion of the representation structure. In order to identify the data element, an identifier identifying the data element is stored in the identifier field of the representation structure. For instance, the identifier may be a random number generated using a random number generator. Thus, in accordance with one embodiment, the identifier is not a function of the data element that is stored in the data portion of the representation structure.

In accordance with another aspect of the invention, methods and apparatus for obtaining a value from an associative dictionary are disclosed. Generally, an associative dictionary maps one or more keys to one or more values, enabling retrieval of each of the values using the corresponding one of the keys. The associative dictionary may be implemented using a variety of data structures such as an array or other suitable data structure. First, a representation structure including a data portion storing a particular data element is obtained, where the representation structure further includes a reference counter field storing a reference counter indicating a number of wrapper structures referencing the representation structure and an identifier field storing an identifier identifying the data element. The identifier is obtained from the identifier field of the representation structure and provided as a key to the associative dictionary. This enables a value corresponding to the identifier to be obtained from the associative dictionary, thereby enabling the identifier identifying the data element to be used as a key to the associative dictionary.

In accordance with yet another aspect of the invention, a representation structure for storing a data element is disclosed. The representation structure includes a data portion for storing the data element, a reference counter field for storing a reference counter indicating a number of wrapper structures referencing the representation structure, and an identifier field for storing an identifier identifying the data element. In accordance with one embodiment, the identifier is generated and stored upon generation and/or storing of the data element (e.g., object) in the representation structure.

In accordance with another aspect of the invention, equivalence of two data elements (e.g., objects) may be ascertained by comparing the identifier of two representation structures. In order to ascertain equivalence of the representation structure (and stored data element) pointed to by the two wrapper structures, the two different wrapper structures may be de-referenced to obtain the corresponding representation structures. The identifiers may then be obtained from the representation structures to enable comparison of the identifiers. Accordingly, the identifiers that are generated or allocated may be used for additional purposes other than retrieval of values from associative dictionaries.

Embodiments of the invention may be implemented software, hardware, or a combination of hardware and software. Embodiments of the invention can also be embodied as computer readable code on a computer readable medium. In addition, embodiments of the invention may also include data structures.

DETAILED DESCRIPTION

In the following description for embodiments of the invention, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
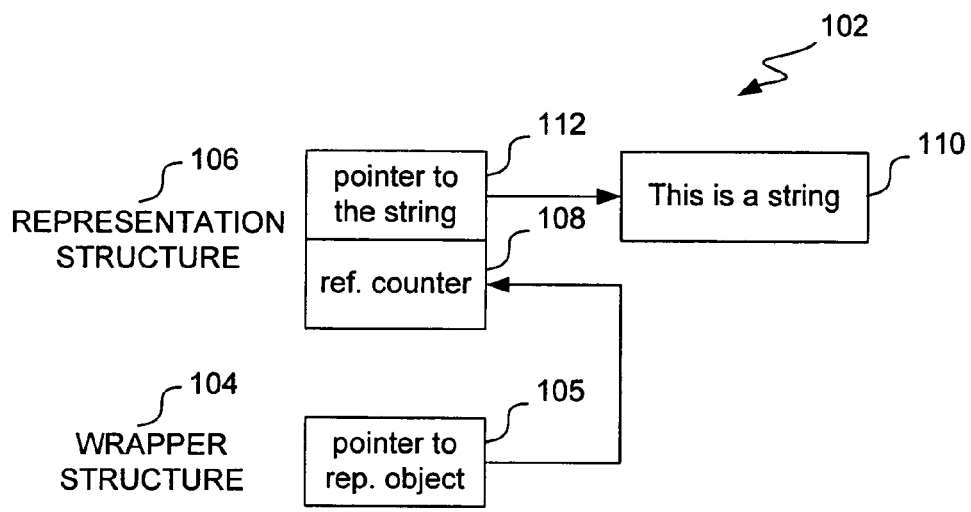
FIG. 1 is a diagram illustrating an exemplary implementation of the reference counting technique.
Figure 2A:
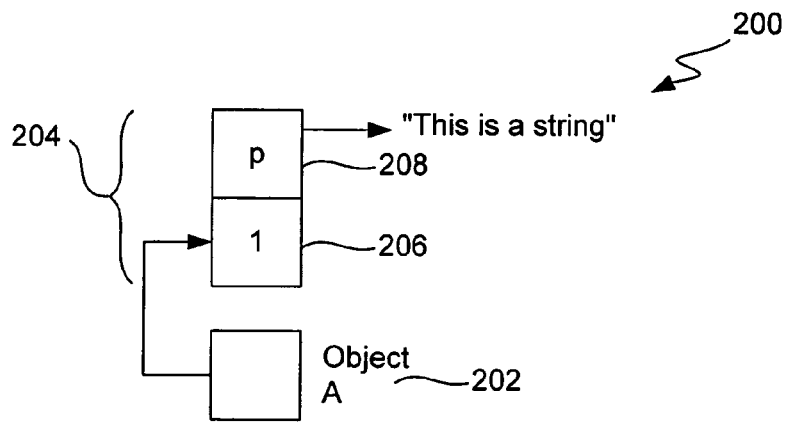
FIG. 2 is a diagram illustrating an exemplary implementation of the reference counting technique after a copy operation has been performed.
Figure 2B:
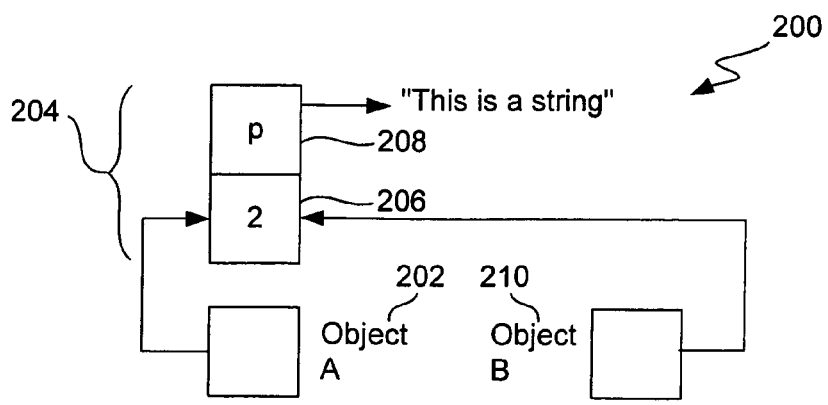
Figure 3:
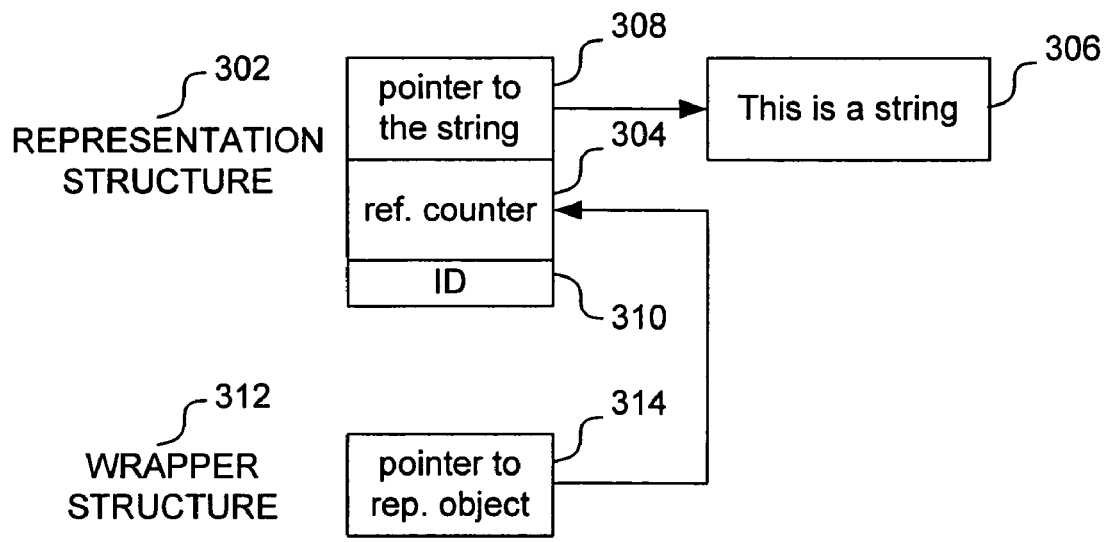
FIG. 3 is a diagram illustrating an exemplary representation structure including an identifier field in accordance with one embodiment of the invention.

FIG. 3 is a diagram illustrating an exemplary representation structure including an identifier field in accordance with one embodiment of the invention. As shown, representation structure 302 includes a reference counter field 304 for storing a reference counter indicating a number of wrapper structures accessing or referencing the representation structure 302 and a data portion 306 for storing the data element, which may be referenced by a pointer 308 to the data element 306. In addition, the representation structure 302 includes an identifier field 310 for storing an identifier identifying the data. As set forth above, one or more wrapper structures 312 may point to the representation structure (i.e., representation object) via a pointer 314, thereby providing access to the representation structure 302.

In accordance with one embodiment, the data element 306 may include a data element such as an integer or string, or an object such as an instantiation of a string class (or other class). When the data element 306 is created and/or stored in the data portion of the representation structure 302, an identifier is obtained (e.g., generated) and stored in the identifier field 310 of the representation structure 302. For instance, when the object is instantiated and stored in the data portion of the representation structure 302, the identifier may be generated and stored in the identifier field 310 of the representation structure 302.

In accordance with one embodiment, the identifier is a random number identifying the data element 306. The random number may be generated using a standard random number generator. Thus, in this example, the identifier is not a function of the data that is stored in the data portion of the representation structure 302. In order to minimize the probability of a collision, the random number generator functions over a large range of numbers, such as 0 to 100,000,000. The larger the range of numbers, the smaller the probability of a collision resulting from the use of random numbers to identify specific data elements. For instance, if one byte capable of storing 256 different values is used, the chance of a collision is 1/256, or approximately 0.39 percent. Generation of an identifier such as a random number may be computationally more efficient than the calculation of hash values as a function of the data (e.g., object) contents, especially when the size of data is significantly large.

While it is possible to use random numbers to identify data elements, in an alternative embodiment, other identifiers, such as non-random numbers, are used to identify data elements. For instance, numerical values may be allocated sequentially as data elements are generated and/or stored (e.g., upon instantiation of objects). However, this sequential numerical allocation would require extra bookkeeping to track the numbers that have been allocated. For example, a data structure such as an array may be used to track the allocation of numerical numbers.

Once an identifier such as a random number is associated with the data element 306 by storing the random number in the identifier field 310 of the representation structure 302, the random number may be used as a key to an associative dictionary. The associative dictionary may be implemented in any suitable data structure, such as an array or table, which enables a one-to-one mapping to be established between keys and data stored in the associative dictionary. As described above, the associative dictionary maps one or more keys to corresponding values such that a one-to-one mapping is established. Thus, by providing a key to the dictionary, a corresponding value may be retrieved from the dictionary. For instance, by providing a random number obtained from the identifier field of a representation structure to an associative dictionary, the corresponding data element (e.g., object) can be used as a key to the associative dictionary.

Figure 4:
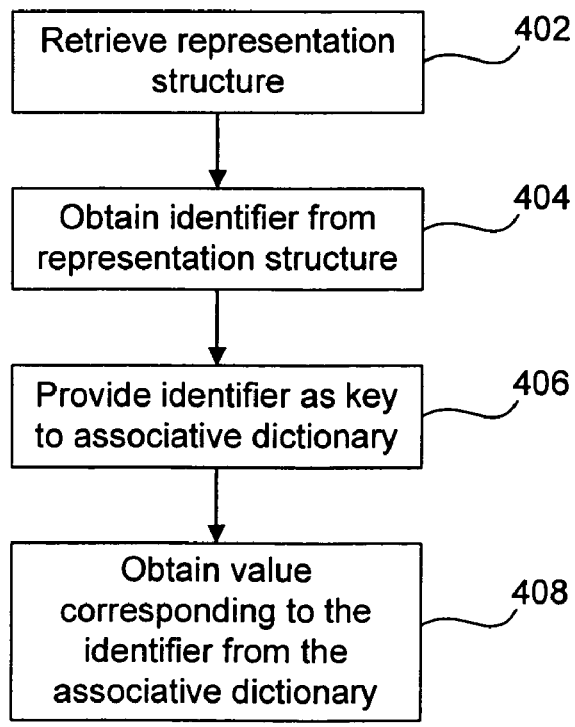
FIG. 4 is a process flow diagram illustrating a method of retrieving a value from an associative dictionary in accordance with one embodiment of the invention.

FIG. 4 is a process flow diagram illustrating a method of retrieving a value from an associative dictionary in accordance with one embodiment of the invention. In this example, a value may be retrieved from an associative dictionary mapping one or more keys to one or more values by providing one of the keys to the associative dictionary. As shown at block 402, a representation structure corresponding to a particular data element (e.g, storing or referencing a particular data element) is retrieved. As described above, the representation structure includes a data portion storing a data element, a reference counter field storing a reference counter indicating a number of wrapper structures referencing the representation structure, and an identifier field storing an identifier identifying the data element. The identifier associated with the data element is then obtained from the identifier field of the representation structure at block 404. Once obtained, the identifier associated with the data element may be provided at block 406 as a key to the associative dictionary. In this manner, a value corresponding to the identifier is obtained at block 408 from the associative dictionary.

As set forth above, identifiers associated with data elements may be used to obtain values from an associative dictionary. For instance, random numbers associated with objects may be used to obtain values from an associative dictionary. In addition, identifiers such as random numbers associated with data elements (e.g., objects) may also be used to ascertain equivalence of those data elements (e.g., objects).

In accordance with one embodiment in which reference counting is implemented, two or more wrapper structures may reference the same representation structure. Specifically, if the reference counter of the representation structure is greater than or equal to two, two or more wrapper structures reference the representation structure. In order to ascertain equivalence of the representation structure (and stored data element) pointed to by the two wrapper structures, the two different wrapper structures may be de-referenced to obtain the corresponding representation structures. The identifiers may then be obtained from the representation structures to enable comparison of the identifiers. Accordingly, the identifiers that are generated or allocated may be used for additional purposes other than retrieval of values from associative dictionaries.

The above-described embodiments enable a key identifying an object to be used to retrieve a corresponding value from an associative dictionary. Thus, a value need not be calculated as a function of the data element (e.g., object) contents to obtain a hash value. Moreover, the disclosed embodiments do not use any characteristic of the implementation of the data element (e.g., object) such as the memory location of the data element at the time of creation (e.g., instantiation). In this manner, computations may be minimized while continuing to achieve a high degree of accuracy. Accordingly, through the use of the described embodiments, the representation structure of an object may be fully relocatable in memory, thereby enabling memory optimization schemes to be implemented.

Figure 5:
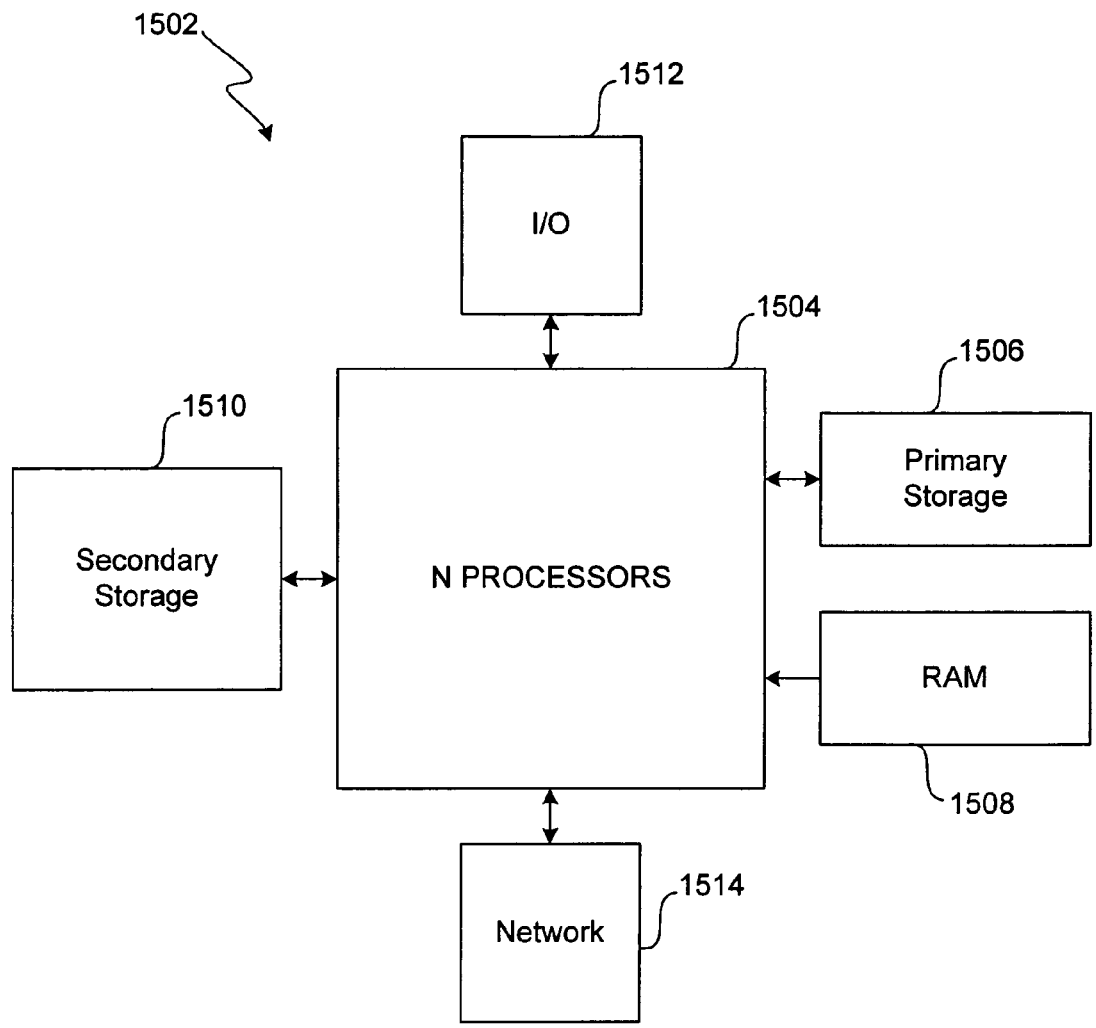
FIG. 5 is a block diagram illustrating a typical, general-purpose computer system suitable for implementing the present invention.

The present invention may be implemented on any suitable computer system. FIG. 5 illustrates a typical, general-purpose computer system 1502 suitable for implementing the present invention. The computer system may take any suitable form.

Computer system 1502 or, more specifically, CPUs 1504, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and secondary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors. One or more servers may be implemented on a single computer system 1530.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk, which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. Thus, one or more components of the computer system 1502 may be located remotely and accessed via a network. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the above-described embodiments are set forth in relation to objects in an object-oriented environment, these embodiments are merely illustrative. Accordingly, the described embodiments may be implemented with respect to a variety of systems and may therefore be implemented in other contexts with alternate data structures. For instance, although the described embodiments are described with reference to representation structures used in combination with wrapper structures to implement the reference counting technique, other data structures may be used in combination with other methods for tracking and identifying objects. For instance, other fields may be used instead of or in addition to a reference counter. Moreover, the above described process blocks are illustrative only. Therefore, the processes may be performed using alternate process blocks as well as alternate data structures. Moreover, the disclosed processes may be performed on the same or different computer systems. For example, one node may retrieve a representation structure, obtain the identifier from the representation structure, and provide the identifier to another node that will obtain the value corresponding to the identifier from an associative dictionary. Accordingly, the present embodiments are to be considered as illustrative and not restrictive, and the invention is not to be limited to the details given herein, but may be modified within the scope and equivalents of the appended claims.

What is claimed is:

1. A method of storing a data element, comprising:
   generating a representation structure including a data portion for storing a data element, a reference counter field for storing a reference counter indicating a number of wrapper structures referencing the representation structure, and an identifier field for storing an identifier identifying the data element, wherein the wrapper structure is an object;
   storing a data element in the data portion of the representation structure; and
   storing an identifier identifying the data element in the identifier field of the representation structure, wherein the identifier is independent of a memory location of the data element.

2. The method as recited in claim 1, wherein the identifier is not a function of the data element that is stored in the data portion of the representation structure.

3. The method as recited in claim 1, further comprising:
   obtaining and storing the identifier when the data element is at least one of created and stored.

4. The method as recited in claim 1, wherein the data element is an object, the method further comprising:
   instantiating the object; and
   generating the identifier identifying the data element.

5. The method as recited in claim 4, wherein generating is performed when the object is instantiated.

6. The method as recited in claim 5, wherein the identifier is a random number.

7. The method as recited in claim 1, wherein the identifier is a random number.

8. A computer-readable medium storing thereon computer-readable instructions for storing a data element, the computer-readable instructions when executed on a computer enables actions comprising:
   generating a representation structure including a data portion for storing a data element, a reference counter field for storing a reference counter indicating a number of wrapper structures referencing the representation structure, and an identifier field for storing an identifier identifying the data element, wherein the wrapper structure is an object;
   storing a data element in the data portion of the representation structure; and
   storing an identifier identifying the data element in the identifier field of the representation structure, wherein the identifier is independent of a memory location of the data element.

9. An apparatus for storing a data element, comprising:
   software and hardware means for generating a representation structure including a data portion for storing a data element, a reference counter field for storing a reference counter indicating a number of wrapper structures referencing the representation structure, and an identifier field for storing an identifier identifying the data element, wherein the wrapper structure is an object;
   software and hardware means for storing a data element in the data portion of the representation structure; and
   software and hardware means for storing an identifier identifying the data element in the identifier field of the representation structure, wherein the identifier is independent of a memory location of the data element.

10. An apparatus for storing a data element, comprising:
    a processor; and
    a memory, at least one of the processor and the memory being adapted for:
    generating a representation structure including a data portion for storing a data element, a reference counter field for storing a reference counter indicating a number of wrapper structures referencing the representation structure, and an identifier field for storing an identifier identifying the data element, wherein the wrapper structure is an object;
    storing a data element in the data portion of the representation structure; and
    storing an identifier identifying the data element in the identifier field of the representation structure, wherein the identifier is independent of a memory location of the data element.

* * * * *

UNITED STATES PATENT AND TRADEMARK OFFICE
CERTIFICATE OF CORRECTION

PATENT NO. : 7,505,997 B1
APPLICATION NO. : 10/838618
DATED : March 17, 2009
INVENTOR(S) : Alexander Gelfenbain It is certified that error appears in the above-identified patent and that said Letters Patent is hereby corrected as shown below:

On the Title Page, item (75) Inventor: line 1, the Inventor's name "Alexander Gelf" should be --Alexander Gelfenbain--.

Signed and Sealed this

Twelfth Day of May, 2009

JOHN DOLL
*Acting Director of the United States Patent and Trademark Office*